US011203416B2

(12) United States Patent
Pant et al.

(10) Patent No.: US 11,203,416 B2
(45) Date of Patent: Dec. 21, 2021

(54) SYSTEMS AND METHODS FOR VARIABLE GAP WIRELESS POWER AND COMMUNICATION

(71) Applicant: Goodrich Corporation, Charlotte, NC (US)

(72) Inventors: Albert Keith Pant, Carlisle, OH (US); Michael Kordik, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 5 days.

(21) Appl. No.: 16/537,093

(22) Filed: Aug. 9, 2019

(65) Prior Publication Data

US 2019/0359327 A1    Nov. 28, 2019

Related U.S. Application Data

(62) Division of application No. 15/426,855, filed on Feb. 7, 2017, now Pat. No. 10,421,534.

(51) Int. Cl.
| | | |
|---|---|---|
| *H02J 17/00* | (2006.01) | |
| *H02J 7/02* | (2016.01) | |
| *B64C 25/34* | (2006.01) | |
| *H02J 50/10* | (2016.01) | |
| *B64C 25/00* | (2006.01) | |
| *H02J 50/12* | (2016.01) | |
| *B60C 23/04* | (2006.01) | |

(52) U.S. Cl.
CPC ............ *B64C 25/34* (2013.01); *B60C 23/043* (2013.01); *B64C 25/001* (2013.01); *H02J 7/025* (2013.01); *H02J 50/10* (2016.02); *H02J 50/12* (2016.02)

(58) Field of Classification Search
CPC . H02J 50/10; H02J 7/025; H02J 50/12; B64C 25/34; B64C 25/001; B60C 23/043
See application file for complete search history.

(56) References Cited

U.S. PATENT DOCUMENTS

| | | |
|---|---|---|
| 7,208,912 B2 | 4/2007 | Ghabra et al. |
| 7,956,718 B2 | 6/2011 | Murphy et al. |
| 8,054,651 B2 | 11/2011 | Pollard |
| 8,111,042 B2 | 2/2012 | Bennett |
| 8,796,886 B2 | 8/2014 | Tan |
| 9,257,851 B2 | 2/2016 | Baarman et al. |
| 9,305,700 B2 | 4/2016 | Lisuwandi |
| 9,397,524 B2 | 7/2016 | Kuennen et al. |

(Continued)

OTHER PUBLICATIONS

European Patent Office, European Search Report dated Jul. 25, 2018 in Application No. 18153385.1202.

(Continued)

*Primary Examiner* — Jared Fureman
*Assistant Examiner* — Esayas G Yeshaw
(74) *Attorney, Agent, or Firm* — Snell & Wilmer L.L.P.

(57) ABSTRACT

Systems and methods for tuning power transmission circuits may sweep a power frequency applied to a transmission coil across a plurality of frequencies. The transmission coil may be inductively coupled to a receiving coil and separated from the receiving coil by an air gap. A current and/or voltage at the transmission coil may be measured in response to the power frequency being at each frequency of the plurality of frequencies. A transmission frequency may be selected based at least in part on the measured current and/or the measured voltage.

11 Claims, 7 Drawing Sheets

(56) References Cited

U.S. PATENT DOCUMENTS

| | | |
|---|---|---|
| 9,502,908 B2 | 11/2016 | Okamoto |
| 9,610,457 B2 * | 4/2017 | Poon ................ A61B 5/0008 |
| 9,859,051 B2 | 1/2018 | Ren et al. |
| 2010/0133917 A1 | 6/2010 | Sekino et al. |
| 2012/0286728 A1 | 11/2012 | Bella et al. |
| 2012/0306284 A1 | 12/2012 | Lee et al. |
| 2014/0143933 A1 | 5/2014 | Low et al. |
| 2014/0322570 A1 | 10/2014 | Nakamura et al. |
| 2014/0354069 A1 * | 12/2014 | Jung ................ H02J 5/005 307/104 |
| 2015/0015084 A1 | 1/2015 | Ichikawa |
| 2015/0180271 A1 | 6/2015 | Angara et al. |
| 2015/0224883 A1 | 8/2015 | Ichikawa et al. |
| 2016/0046158 A1 | 2/2016 | Keller et al. |
| 2016/0141889 A1 | 5/2016 | Choudhary et al. |
| 2016/0285300 A1 | 9/2016 | Summers et al. |
| 2016/0329749 A1 * | 11/2016 | Yang ................ B60C 23/0413 |
| 2020/0266673 A1 * | 8/2020 | Reynolds ................ H02J 50/80 |

OTHER PUBLICATIONS

USPTO, Restriction Requirement dated Aug. 27, 2018 in U.S. Appl. No. 15/426,855.
USPTO, Pre Interview First Office Action dated Jan. 23, 2019 in U.S. Appl. No. 15/426,855.
USPTO, Final Office Action dated May 13, 2019 in U.S. Appl. No. 15/426,855.
USPTO, Notice of Allowance dated Jul. 10, 2019 in U.S. Appl. No. 15/426,855.
USPTO, First Action Interview Summary dated Mar. 8, 2019 in U.S. Appl. No. 15/426,855.
European Patent Office, European Office Action dated Dec. 12, 2019 in Application No. 18153385.2.

\* cited by examiner

SYSTEMS AND METHODS FOR VARIABLE GAP WIRELESS POWER AND COMMUNICATION

CROSS REFERENCE TO RELATED APPLICATIONS

This application is a divisional of, and claims priority to, and the benefit of U.S. Non-Provisional application Ser. No. 15/426,855, entitled "SYSTEMS AND METHODS FOR VARIABLE GAP WIRELESS POWER AND COMMUNICATION," filed on Feb. 7, 2017, which is hereby incorporated by reference in its entirety.

FIELD

The disclosure relates generally to wireless power and communication across a variable gap.

BACKGROUND

Wireless battery chargers typically operate with a fixed gap of a known distance between a transmission coil and a receiving coil. By knowing the fixed gap, the resonant frequency can be set to give the maximum power transfer with the best efficiency. Typically, the circuit is fixed in structure with the power supplying the circuit also fixed in frequency.

Aircraft wheels may be equipped with inductively coupled coils to communicate between rotating and static frames on and about the wheels. The air gap between various coils is often unpredictable. Manufacturing tolerances of multiple parts coupled together can result in different air gap distances between otherwise similar configurations. Furthermore, the air gap between coils may vary over time with wear and use of the surrounding components. For example, as temperatures change or components settle into varying positions relative to one another, the alignment and spacing between adjacent coils may vary. A fixed circuit with fixed transmission characteristics may not adequately adapt to the varying gap.

SUMMARY

A method of tuning a power transmission circuit is provided. The method may include sweeping a power frequency applied to a transmission coil across a plurality of frequencies. The transmission coil may be inductively coupled to a receiving coil and separated from the receiving coil by an air gap. A current and/or voltage at the transmission coil may be measured in response to the power frequency being at each frequency of the plurality of frequencies. A transmission frequency may be selected based at least in part on the measured current and/or the measured voltage.

The plurality of frequencies may be selected in response to a binary search. The plurality of frequencies may also be predetermined. The air gap separating the transmission coil and the receiving coil may range in distance between 0.05 inches and 0.3 inches. The receiving coil may rotate relative to the transmission coil and, for example, be disposed within a hubcap.

A power transmission system for an aircraft is also disclosed. The power transmission system may comprise a power transmission circuit including a transmission coil and a receiving coil inductively coupled to the transmission coil. The receiving coil may be separated from the transmission coil by a variable air gap. The power transmission circuit may be configured to sweep a power frequency applied to the transmission coil and measure at least one of a voltage or a current in response to the sweep. The power transmission circuit may also be configured to select a transmission frequency for the transmission coil in response to the voltage or the current.

In various embodiments, the receiving coil may be disposed on the hubcap, and the transmission coil may be disposed on the axle telemetry unit. The hubcap may rotate relative to the axle telemetry unit. A controller may be in electronic communication with the power transmission circuit. A tank circuit may be coupled to the transmission coil to measure the voltage or the current. The power transmission circuit may be configured to sweep the power frequency applied to the transmission coil across a plurality of frequencies. In response to a binary search, the power transmission circuit may select the plurality of frequencies. The plurality of frequencies may also be predetermined.

A wheel assembly for an aircraft is also provided. The wheel assembly may include an axle, a wheel coupled to the axle and configured to rotate about the axle, a transmission coil disposed in the axle, and a hubcap mounted on the wheel. A receiving coil of the hubcap may be disposed adjacent the transmission coil, which is in the axle. The transmission coil may be separated from the receiving coil by a variable air gap. A power transmission circuit may transmit power from the transmission coil to the receiving coil. The power transmission circuit may select a transmission frequency in response to a voltage or a current of the transmission coil.

In various embodiments, the variable air gap may vary between 0.05 inches and 0.3 inches. The power transmission circuit may sweep a power frequency applied to the transmission coil across a plurality of frequencies, and measure the voltage or the current in response to the power frequency being at each of the plurality of frequencies. The power transmission circuit may further select the transmission frequency in response to detecting an extrema in the current or the voltage.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "distal" refers to the direction radially outward, or generally, away from the axis of rotation of a wheel. As used herein, "proximal" refers to a direction radially inward, or generally, towards the axis of rotation of a wheel.

Figure 1:
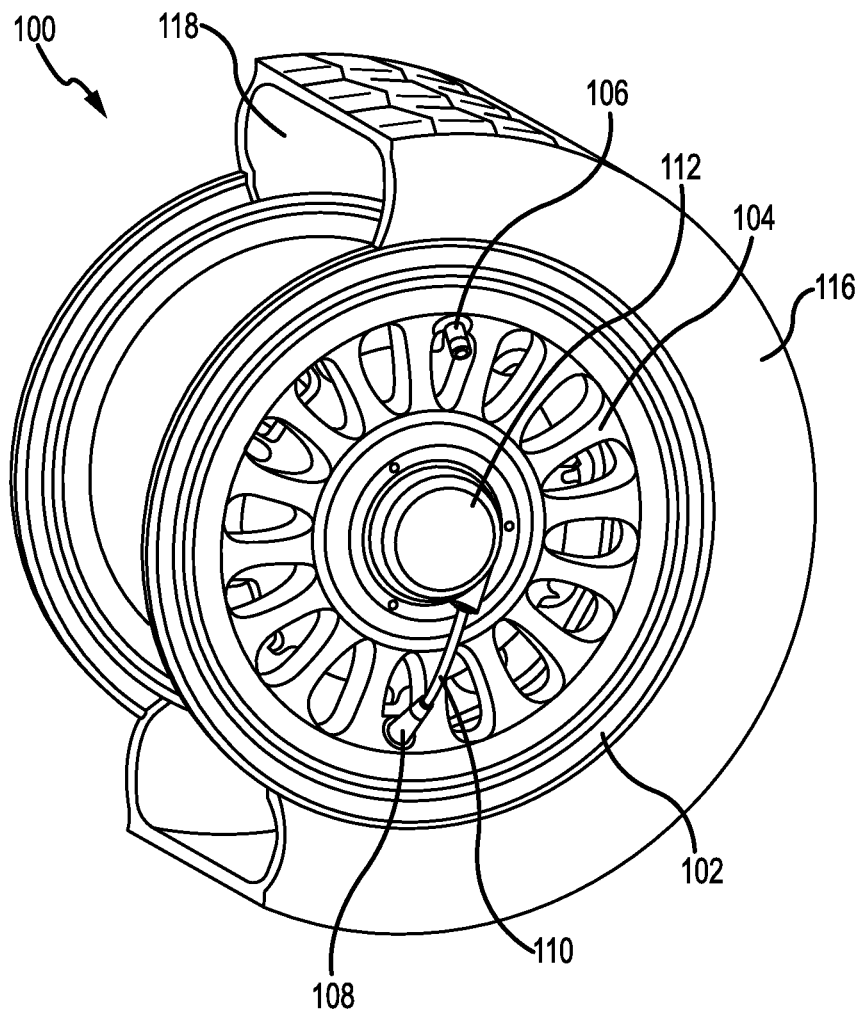
FIG. 1 illustrates a wheel assembly for a landing gear including a hubcap monitoring tire pressure, in accordance with various embodiments.

FIG. 1 illustrates a wheel 100 for a landing gear assembly including a hubcap 112 is shown according to various embodiments. Hubcap 112 may have electronic components to perform various health monitoring tasks such as, for example, monitoring tire pressure. Wheel 100 includes lip 102 around a distal circumference of the wheel 100. Spokes 104 connect lip 102 to the center bore of wheel 100. Valve stem 106 protrudes through an opening in wheel 100 for filling tires with air and checking tire pressure using a manual gage. Tire pressure sensor (TPS) 108 may attach to wheel 100 to take an electronic measurement of tire pressure in chamber 118 between wheel 100 and a tire 116 mounted on wheel 100. TPS 108 is electrically connected through conduit 110 to hubcap 112. Conduit 110 may include wires. The wires of conduit 110 may be in a twisted pair configuration, for example.

Figure 2A:
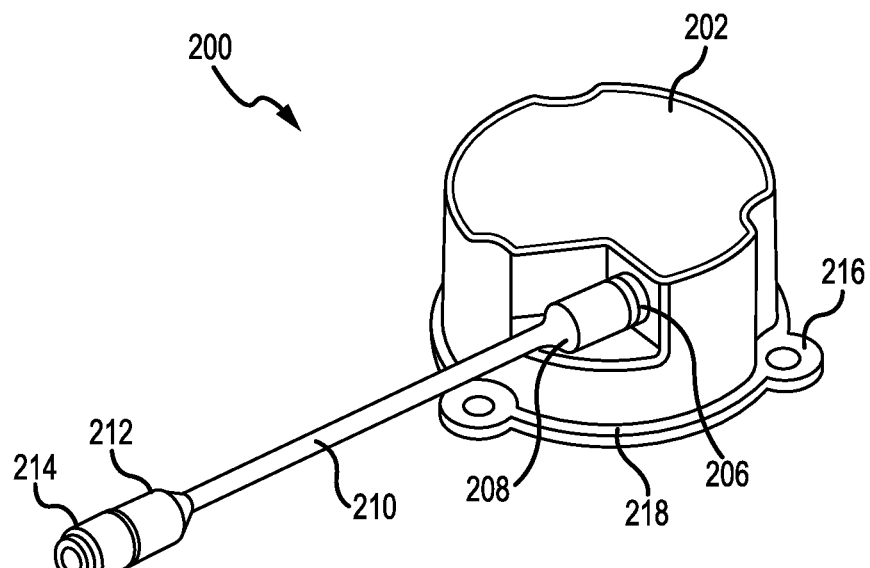
FIG. 2A illustrates a hubcap to receive a tire pressure measurement, in accordance with various embodiments.

FIG. 2A is a perspective view of an exemplary hubcap to receive a tire pressure measurement and transmit the tire pressure measurement, in accordance with various embodiments. Hubcap 200 includes housing 202. Housing 202 may be made of metals, plastics, ceramics, or other materials to provide environmental protection. Housing 202 includes interface 206 to connect to interface 208 of conduit 210. For example, conduit 210 may comprise wires surrounded by insulation. Conduit 210 includes interface 212 to mate with a TPS via connection 214. The TPS takes an electronic measurement of tire pressure and sends the electronic measurement through conduit 210 to hubcap 200. Hubcap 200 may be attached to a wheel by mounting points 216 on rim 218 of housing 202. Hubcap 200 may rotate with the wheel to which it is mounted.

Figure 2B:
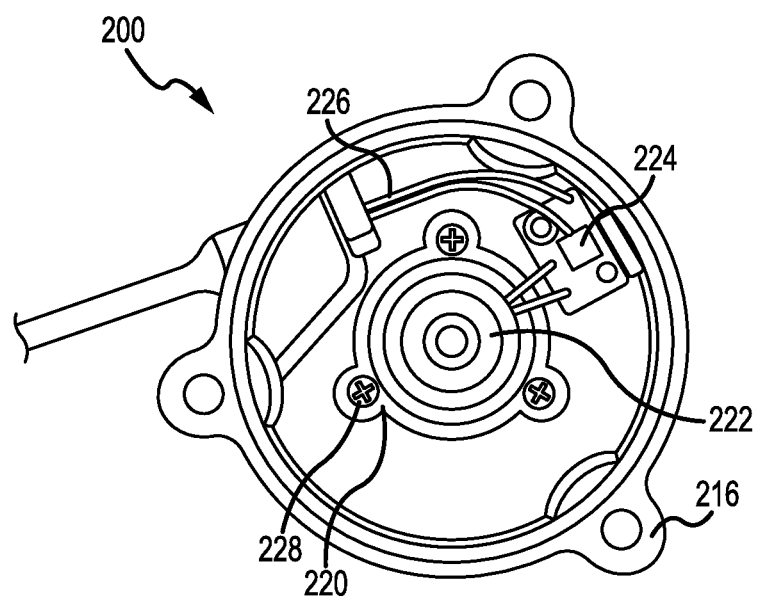
FIG. 2B illustrates a hubcap to receive a tire pressure measurement, in accordance with various embodiments.

FIG. 2B illustrates a back side of a hubcap to receive a tire pressure measurement and transmit the tire pressure measurement, in accordance with various embodiments. Hubcap 200 may include tank 220 fastened to hubcap 200 by fasteners 228. Tank 220 includes a capacitor and a coil 222 and is also known as an LC tank circuit. Coil 222 may be an electrical input to hubcap 200. Coil 222 may be a ferrite wound coil. Coil 222 may be electrically connected to circuit 224, which includes at least one capacitor. Leads 226 electrically connect circuit 224 through conduit 210 to a TPS.

Figure 3:
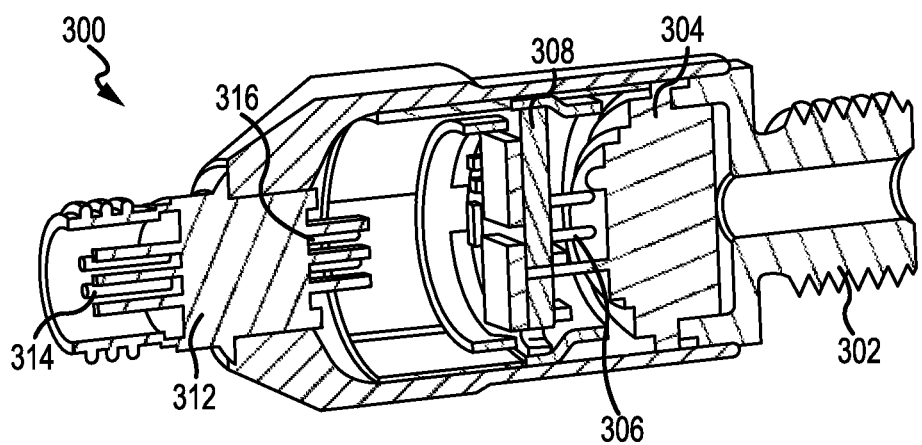
FIG. 3 illustrates a tire pressure sensor for use with a hubcap to measure tire pressure, in accordance with various embodiments.

FIG. 3 illustrates an exemplary TPS 300 for use with a hubcap 200 of FIG. 2A, in accordance with various embodiments. TPS 300 includes pressure fitting 302. Pressure fitting 302 interfaces to fluidly connect TPS 300 to the chamber between the tire and the wheel. TPS 300 also includes a transducer 304 to convert pressure into an electrical signal. Leads 306 electrically connect transducer 304 to circuit card assembly ("CCA") 308. CCA 308 is electrically connected to pins 316 of connector 312. Connector 312 has external pins 314 to electrically connect to an interface of a conduit.

Figure 4:
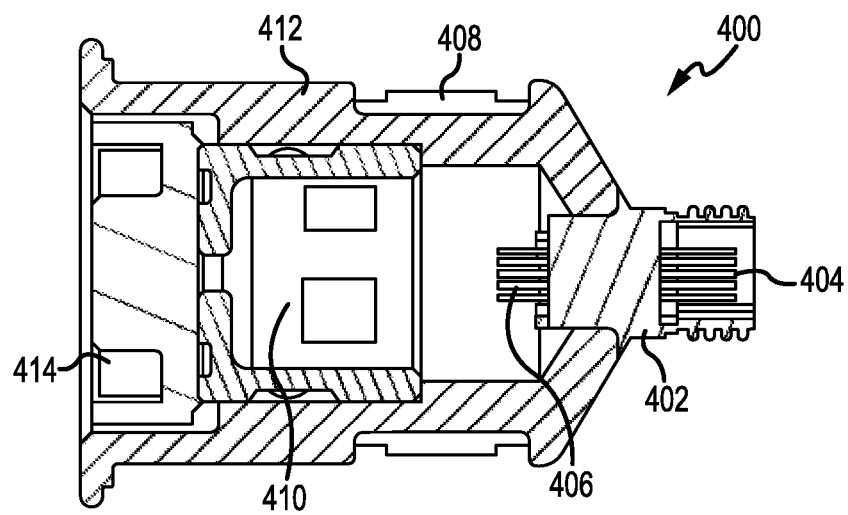
FIG. 4 illustrates an axle telemetry unit for use with a hubcap to measure tire pressure, in accordance with various embodiments.

FIG. 4 illustrates an exemplary axle telemetry unit (ATU) 400 for use with a hubcap 200 of FIG. 2A, in accordance with various embodiments. ATU 400 includes connector 402. Connector 402 includes external pins 404 and internal pins 406. Internal pins are electrically connected to tank 410. EMI gasket 408 electrically connects ATU 400 from its supporting structure and shields ATU 400 from electromagnetic interference. Housing 412 surrounds ATU 400 and environmentally protects ATU 400. Coil 414 is electrically connected to tank 410. Coil 414 faces outward from a center bore of a wheel and/or axle, and hubcap 200 is mounted over coil 414 wound in ferrite with coil 222 (from FIG. 2B) adjacent to coil 414 to allow the signal from spinning hubcap 200 (from FIG. 2A) to transmit into ATU 400 that is stationary and/or spinning at a different angular velocity.

Figure 5:
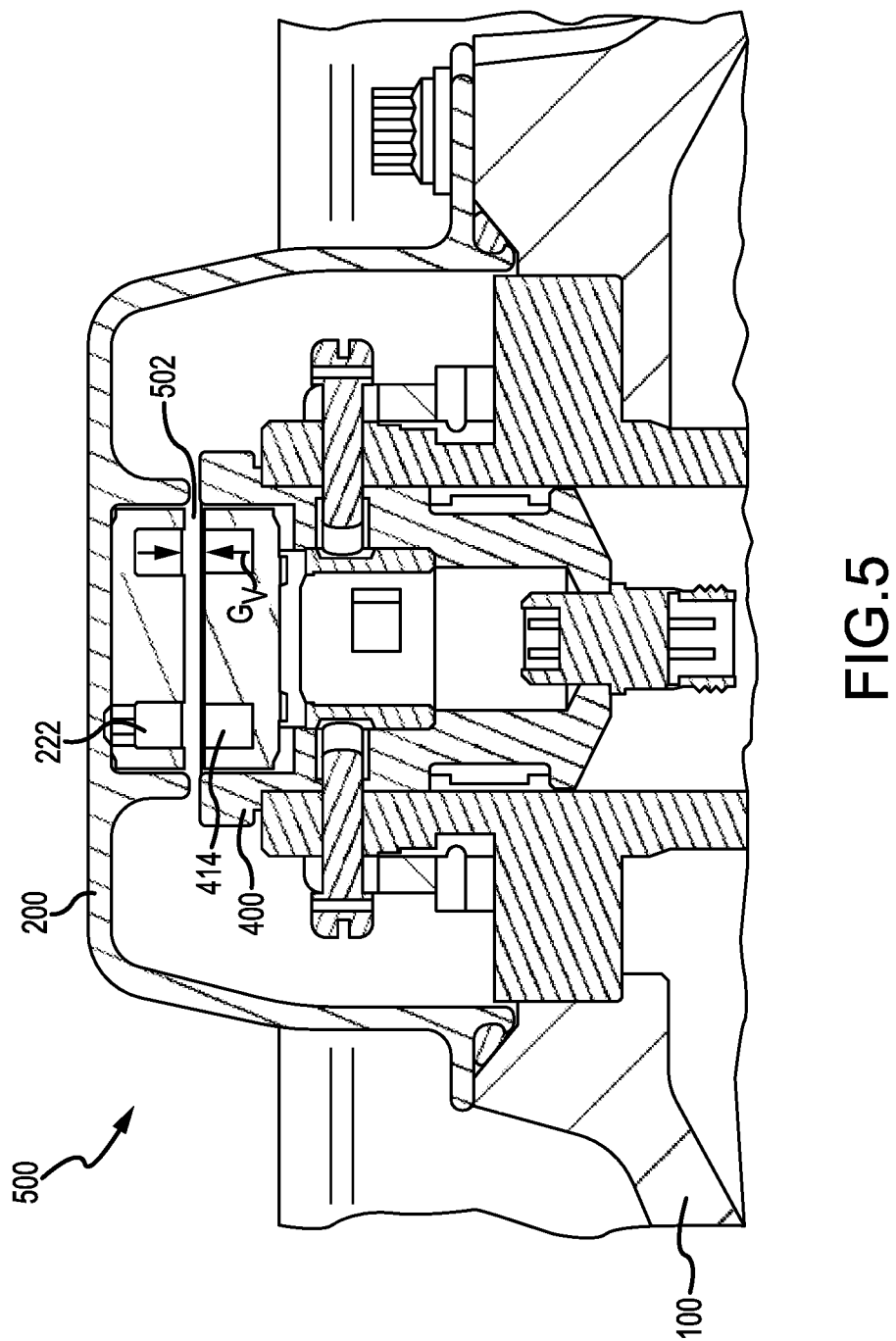
FIG. 5 illustrates a power transmission and communication system including an inductively coupled hubcap and telemetry unit separated by a variable air gap, in accordance with various embodiments.

Referring now to FIG. 5, an exemplary power transmission and communication system 500 is shown according to various embodiments. System 500 may include hubcap 200 mounted to wheel 100. Hubcap 200 is oriented with coil 222 facing coil 414 of ATU 400 with coil 222 inductively coupled with coil 414. Although ATU 400 is depicted, a wheel speed transducer (WST) may also be inductively coupled to coil 222 and placed in the position of ATU 400. Coil 222 and coil 414 are separated by gap 502. Coil 414 and/or coil 222 may be wound in ferrite. Gap 502 may be an air gap, for example, separating hubcap 200 in a rotating frame from ATU 400 in a static frame.

Gap 502 may comprise a distance Gv separating coil 414 from coil 222. The distance Gv of gap 502 may vary in response to manufacturing tolerances of parts in the wheel assembly, environmental conditions, wear, and use, among other things. Distance Gv of gap 502 may range from 0.05 inches to 0.3 inches (0.13 cm to 0.76 cm), 0.04 inches to 0.4 inches (0.10 cm to 1.0 cm), or 0.03 to 0.5 inches (0.076 cm to 1.27 cm), for example. Various features of the transmission circuit and/or receiving circuit may be adjustable to tune the circuits in response to a changed distance Gv.

Figure 6:
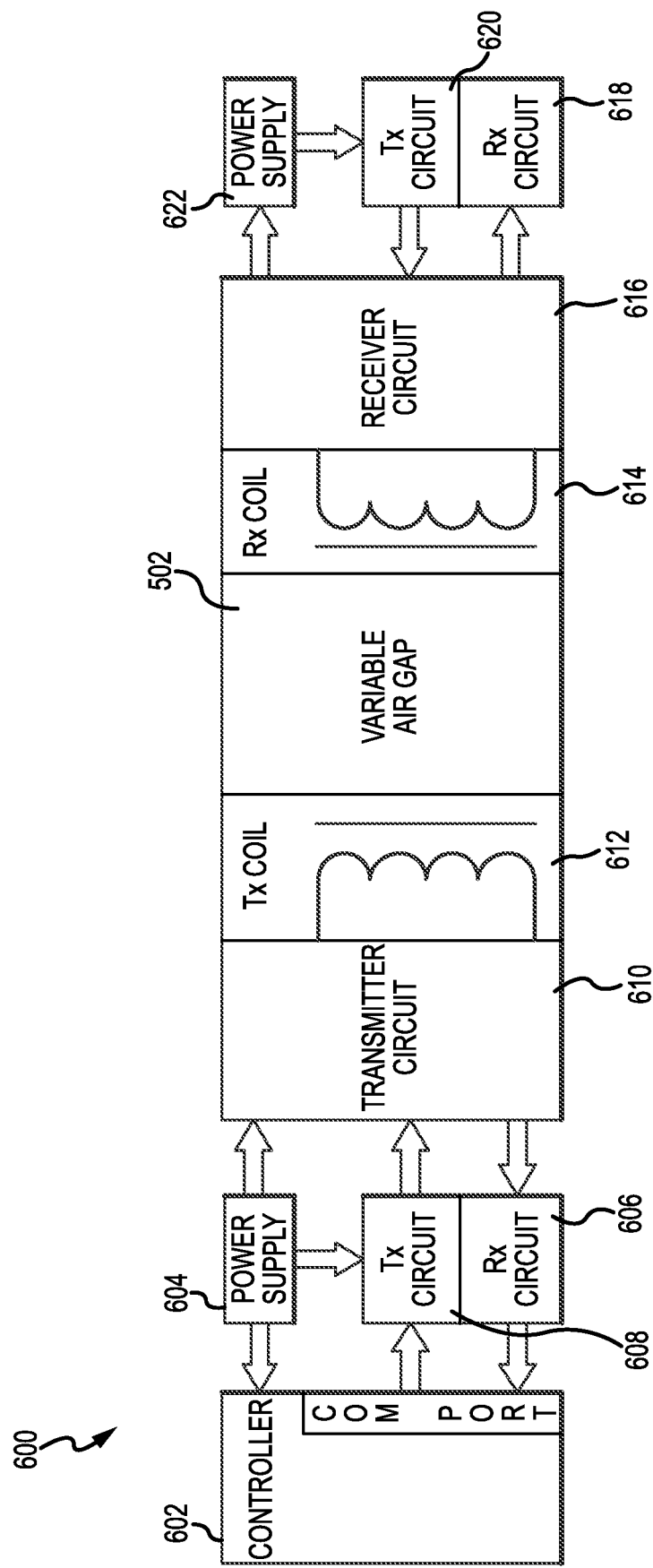
FIG. 6 illustrates an exemplary power transmission circuit for use with a variable air gap, in accordance with various embodiments.

With reference to FIG. 6, an exemplary power transmission circuit 600 is shown for use with power transmission and communication system 500 of FIG. 5, in accordance with various embodiments. Power transmission circuit 600 may be coupled to a controller 602. Controller 602 may be, for example, brake control unit (BCU). Controller 602 may be a standalone computer system and/or controller 602 may be integrated into computer systems onboard an aircraft, for example, a full authority digital engine control (FADEC), and/or an engine-indicating and crew-alerting system (EI-CAS). Controller 602 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 602 may comprise a processor configured to implement various logical operations in response to execution of instructions. Instructions may be stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the circuit may comprise one or more semiconductor devices that form a sinewave generator signal, a power amplifier, and a resonant LC tank circuit. For example, power supply 604 may be in logical communication with controller 602. Controller 602 may select operating parameters of power supply 604. For example, controller 602 may select the frequency, voltage, and/or current generated by power supply 604. Controller 602 may also include a communication port to interface with a first transmission circuit 608 and a first receiving circuit 606. First transmission circuit 608 may prepare a signal for transmission. First receiving circuit 606 may condition a received transmission by decoding, amplifying, filtering, or otherwise processing a received signal. The transmission coil 612 may be in communication with transmitter circuit 610 and may broadcast a signal provided by transmitter circuit 610. Although transmission coil 612 is configured to transmit signals, it may also be configured to receive signals transmitted by the receiving coil 614. Transmission coil 612 and the circuitry in electronic communication with the transmission coil 612 via electronic conductors may be disposed in ATU 400 of FIG. 5, for example.

In various embodiments, receiving coil 614 may be disposed in hubcap 200 of FIG. 5, for example. The receiver circuit 616 may be coupled to the receiving coil 614. The receiving circuit may forward a received signal to as second receiving circuit 618. A second transmission circuit 620 may also be in communication with receiver circuit 616. Receiver circuit 616 may alter its characteristics to send a signal back through receiving coil 614 to transmission coil 612, for example, by temporarily dropping the voltage across the receiving coil to 0. A secondary voltage may also be measured from a powered up sensor on the receiver circuit 616 to further tune the frequency. The secondary voltage may be transmitted from receiving coil 614 to transmission coil 612 to identify a suitable transmission frequency. Power supply 622 may be in communication with receiver circuit 616 and may comprise a rechargeable battery. The battery may be charged using power transmitted by transmission coil 612. Power supply 622 may also be circuitry to deliver power received from transmission coil 612.

In various embodiments, a transmitter circuit 610 may comprise one or more semiconductor devices that form a sinusoidal signal for transmission, amplification circuitry, and/or the tank circuitry. Transmitter circuit 610 may also comprise circuitry for current and voltage sensing. The transmitter circuitry may be configured to sweep a frequency range around the resonant frequency of the LC tank circuit. Controller 602 may enable the transmitter circuit 610 to apply the sweep frequency range to the LC tank circuit and measure the current and voltage across and/or through the transmission coil and/or other circuitry for each frequency. The voltage and/or current measurements may be used to identify optimal and/or satisfactory operating conditions (e.g., a transmission frequency) for transmission.

In various embodiments, transmitter circuit 610 may identify the highest peak voltage and/or lowest current produced during the sweep, for example. The frequency of the highest peak voltage and lowest current may then be used to supply transmission power to the LC tank circuit. The identified frequency may be used in power transmission circuit 600 until the controller 602 is disabled and then re-enabled, for example. The identified power transmission circuit 600 may also be configured to update and retune at fixed or random time intervals. A new sweep may be performed in response to the transmitter circuitry being enabled. The power transmission circuit 600 may thus automate the process illustrated in part by the graphs of FIG. 7 and the process of FIG. 8.

Figure 7:
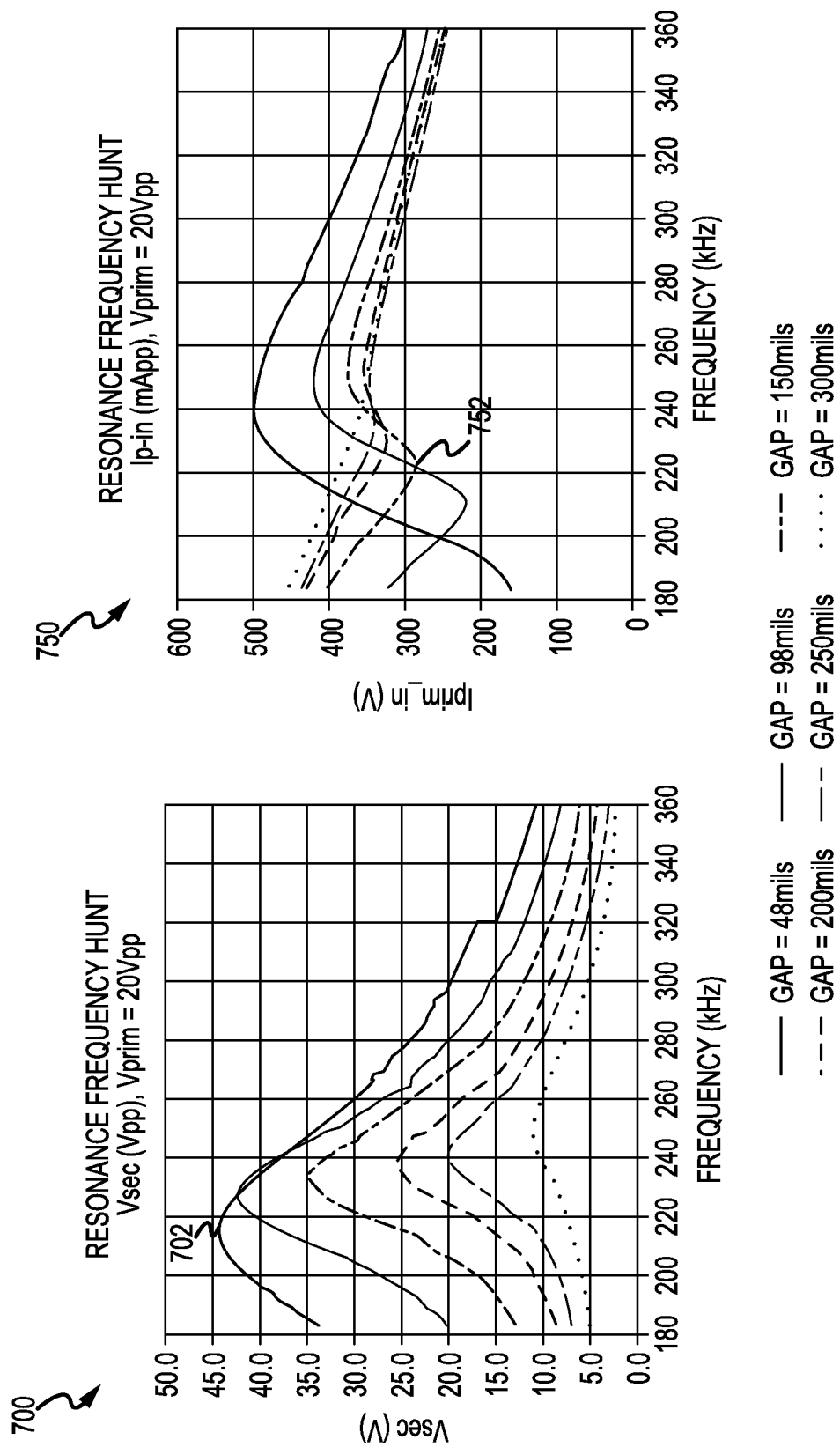
FIG. 7 illustrates exemplary voltage and current measurements at various frequencies with various air gap distances, in accordance with various embodiments.
Figure 8:
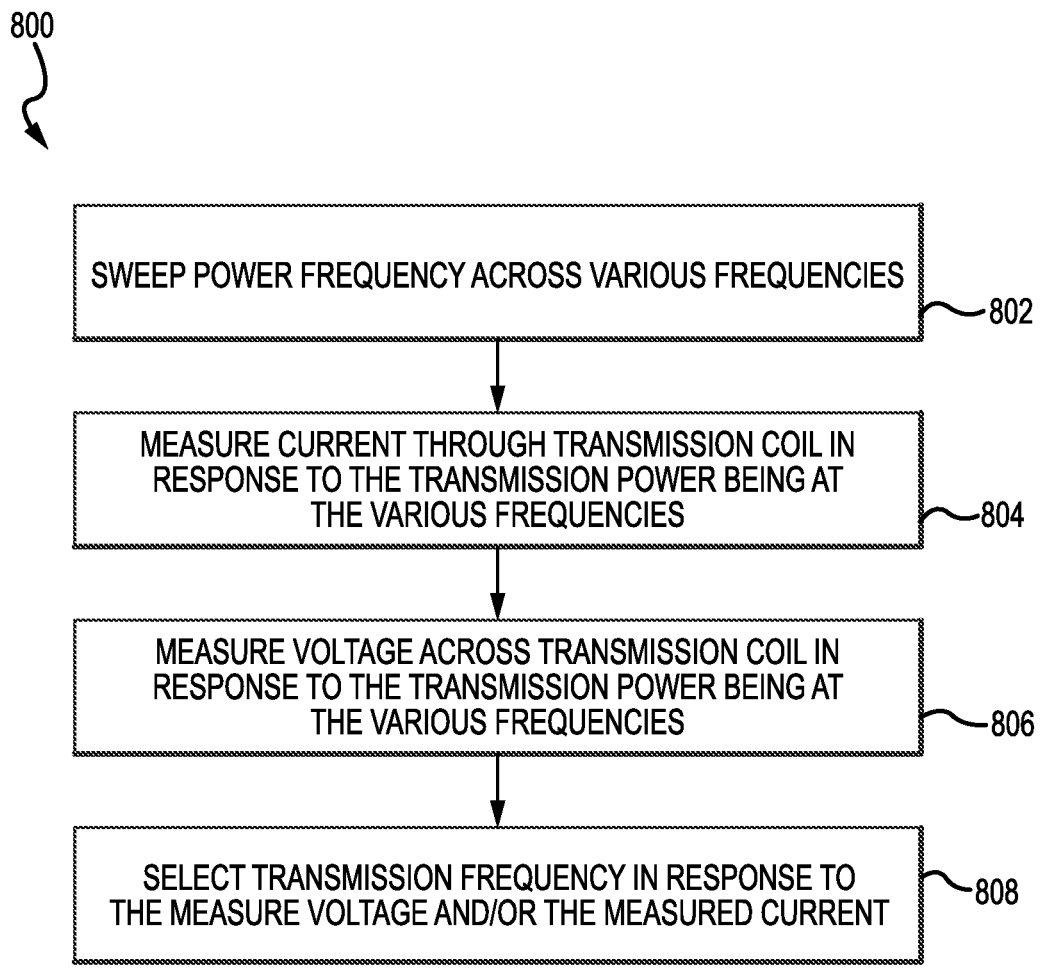
FIG. 8 illustrates a process for tuning a transmission circuit in response to voltage and/or current measurements taken in response to sweeping a power frequency, in accordance with various embodiments.

With reference to FIGS. 7 and 8, an exemplary process 800 is shown for tuning power transmission circuit 600. Process 800 may begin by sweeping the power frequency across various frequencies (Block 802). The various frequencies may include a set of preselected frequencies, for example. The various frequencies may also be selected based on an algorithm such as, for example, a binary search. The various frequencies may include two or more frequencies at which current and/or voltage in the transmission coil 612 of FIG. 6 may be measured.

In various embodiments, transmitter circuit 610 of FIG. 6 may measure the current through transmission coil 612 of FIG. 6 in response to the transmission power being at the various frequencies (Block 804). Plot 750 of FIG. 7 illustrates an exemplary plot of currents measured in response to transmission power being at various frequencies and with varied air gap distances. Transmitter circuit 610 may also measure the voltage across transmission coil 612 in response to the transmission power being at the various frequencies (Block 806). Plot 700 of FIG. 7 illustrates an exemplary plot of voltages measured in response to transmission power being at various frequencies and with varied air gap distances. Although the voltage and current measurements are described as across and through the transmission coil 612, the current and voltage may be measured at any point in power transmission circuit 600 and used to select a transmission frequency.

In various embodiments, power transmission circuit 600 may select a frequency in response to the measured voltage and/or the measured current (Block 808). The system may select an optimal and/or satisfactory transmission frequency in response to the measurements of voltage and/or currents (e.g., detecting local or global extrema in the voltage/current). For example, the frequency may be selected in response to detecting a maximum voltage. Referring to plot 700, for example, the local extrema 702 of voltage (e.g., local maximum voltage) with an air gap of 48 thousandths of an inch (1.2 mm) is observed at approximately 215 kHz. The system may thus select the frequency of 215 kHz to transmit power from transmission coil 612 of FIG. 6 to receiving coil 614 of FIG. 6.

In another example, the frequency may be selected in response to detecting local minimum current. Referring to plot 750, the local extrema 752 of current (e.g., local minimum current) with an air gap of 98 thousandths of an inch (2.4 mm) is observed at approximately 210 kHz. The system may thus select the frequency of 210 kHz to transmit power from transmission coil 612 of FIG. 6 to receiving coil 614 of FIG. 6. The system may also use a lookup table to look up an optimal and/or satisfactory transmission frequency corresponding to the measured voltage and/or current. The system may further select an optimal and/or satisfactory transmission frequency by applying a function to the measured voltages and/or currents.

The power transmission and communication systems of the present disclosure may simplify tuning the resonant LC tank circuit for wireless power and communications across a variable air gap. The systems may tunes the resonant LC tank circuit as the air gap changes due to assembly tolerances, due to wear of mechanical parts, and due to temperature changes. The retunes may occur at fixed time intervals, random intervals, or in response to triggering events. Power transmission and communications systems described herein may obviate complex mounting schemes to produce a fixed air gaps.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power transmission system for an aircraft, comprising:
a power transmission circuit, comprising:
a transmission coil;
a receiving coil inductively coupled to the transmission coil, wherein the receiving coil is separated from the transmission coil by a variable air gap defined by the receiving coil and the transmission coil; wherein:
the power transmission circuit is configured to sweep a power frequency range applied to the transmission coil across a plurality of frequencies and measure at least one of a voltage or a current in response to the sweep,
the power transmission circuit is configured to select a transmission frequency for the transmission coil in response to the voltage or the current,
the transmission frequency is selected based at least in part on a local minima of the current at a corresponding frequency in the plurality of frequencies, and
the local minima of the current is configured to vary as the variable air gap varies.

2. The power transmission system of claim 1, further comprising a hubcap with the receiving coil disposed on the hubcap.

3. The power transmission system of claim 2, further comprising an axle telemetry unit with the transmission coil disposed on the axle telemetry unit.

4. The power transmission system of claim 3, wherein the hubcap is configured to rotate relative to the axle telemetry unit.

5. The power transmission system of claim 1, further comprising a controller in electronic communication with the power transmission circuit.

6. The power transmission system of claim 1, further comprising a tank circuit coupled to the transmission coil and configured to measure the voltage or the current.

7. The power transmission system of claim 1, wherein the power transmission circuit is configured to select the plurality of frequencies in response to a binary search.

8. The power transmission system of claim 1, wherein the plurality of frequencies are predetermined.

9. A wheel assembly for an aircraft, comprising:
an axle;
a wheel coupled to the axle and configured to rotate about the axle;
a transmission coil disposed in the axle;
a hubcap mounted on the wheel with a receiving coil of the hubcap adjacent the transmission coil disposed in the axle, wherein the transmission coil is separated from the receiving coil by a variable air gap defined by the receiving coil and the transmission coil; and
a power transmission circuit configured to transmit power from the transmission coil to the receiving coil, wherein:
the power transmission circuit is configured to sweep a power frequency range applied to the transmission coil across a plurality of frequencies and measure at least one of a voltage or a current in response to the sweep,
the power transmission circuit is configured to select the transmission frequency for the transmission coil in response to the voltage or the current,
the transmission frequency is selected based at least in part on a local extrema of the current or the voltage at a corresponding frequency in the plurality of frequencies, and
the local extrema of the current or the voltage is configured to vary as the variable air gap varies.

10. The wheel assembly of claim 9, wherein the variable air gap varies between 0.05 inches and 0.3 inches.

11. A power transmission system for an aircraft, comprising:
a power transmission circuit, comprising:
a transmission coil;
a receiving coil inductively coupled to the transmission coil, wherein the receiving coil is separated from the transmission coil by a variable air gap defined by the receiving coil and the transmission coil; wherein:
the power transmission circuit is configured to sweep a power frequency range applied to the transmission coil across a plurality of frequencies and measure at least one of a voltage or a current in response to the sweep,
the power transmission circuit is configured to select a transmission frequency for the transmission coil in response to the voltage or the current,
the transmission frequency is selected based at least in part on a local maxima of the voltage at a corresponding frequency in the plurality of frequencies, and
the local maxima of the voltage is configured to vary as the variable air gap varies.

* * * * *